United States Patent

[11] 3,603,732

[72] Inventor John Barrett George
Indianapolis, Ind.
[21] Appl. No. 830,645
[22] Filed June 5, 1969
[45] Patented Sept. 7, 1971
[73] Assignee RCA Corporation

[54] INSTANT-ON CIRCUITRY FOR SOLID STATE TELEVISION RECEIVERS
5 Claims, 1 Drawing Fig.

[52] U.S. Cl. ........ 178/7.5 R, 315/105, 325/492, 178/DIG. 11
[51] Int. Cl. ........ H04n 3/16
[50] Field of Search ........ 178/6 PS, 7.5 E, 7.5 R; 325/492, 493, 494, 495; 307/109, 150; 315/94, 105, 8; 328/262

[56] References Cited
UNITED STATES PATENTS

| | | | |
|---|---|---|---|
| 2,297,618 | 9/1942 | Grimes et al. | 178/6 |
| 2,428,008 | 9/1947 | Brakel et al. | 315/105 |
| 3,344,307 | 9/1967 | Anrooy et al. | 315/8 |
| 3,339,105 | 8/1967 | Busse | 328/260 |
| 3,514,532 | 5/1970 | Ludlam | 178/7.5 E |

*Primary Examiner*—Robert L. Griffin
*Assistant Examiner*—Donald E. Stout
*Attorneys*—Eugene M. Whitacre and William H. Meagher

ABSTRACT: In a solid state television receiver, the primary windings of a main and an auxiliary transformer are both coupled across an AC input line. A single-pole, single-throw switch interposed in one conductor of AC input line subsequent to auxiliary transformer takeoff point permits deenergization of main transformer primary winding without interrupting energization of auxiliary transformer primary winding. One secondary winding of main transformer provides AC input to television receiver power supply. Kinescope filament is energized by circuit comprising a secondary winding of auxiliary transformer in series with an additional secondary winding of main transformer. When switch is closed, receiver is "on" with power supply operative and kinescope filament receiving full rated voltage comprising sum of secondary contributions. When switch is open, receiver is in "standby" condition—with power supply inoperative, but kinescope filament energized at reduced level representing contribution of auxiliary transformer secondary alone. In remote control embodiment, auxiliary transformer has additional secondary winding providing AC input to remote control receiver power supply.

PATENTED SEP 7 1971
3,613,732
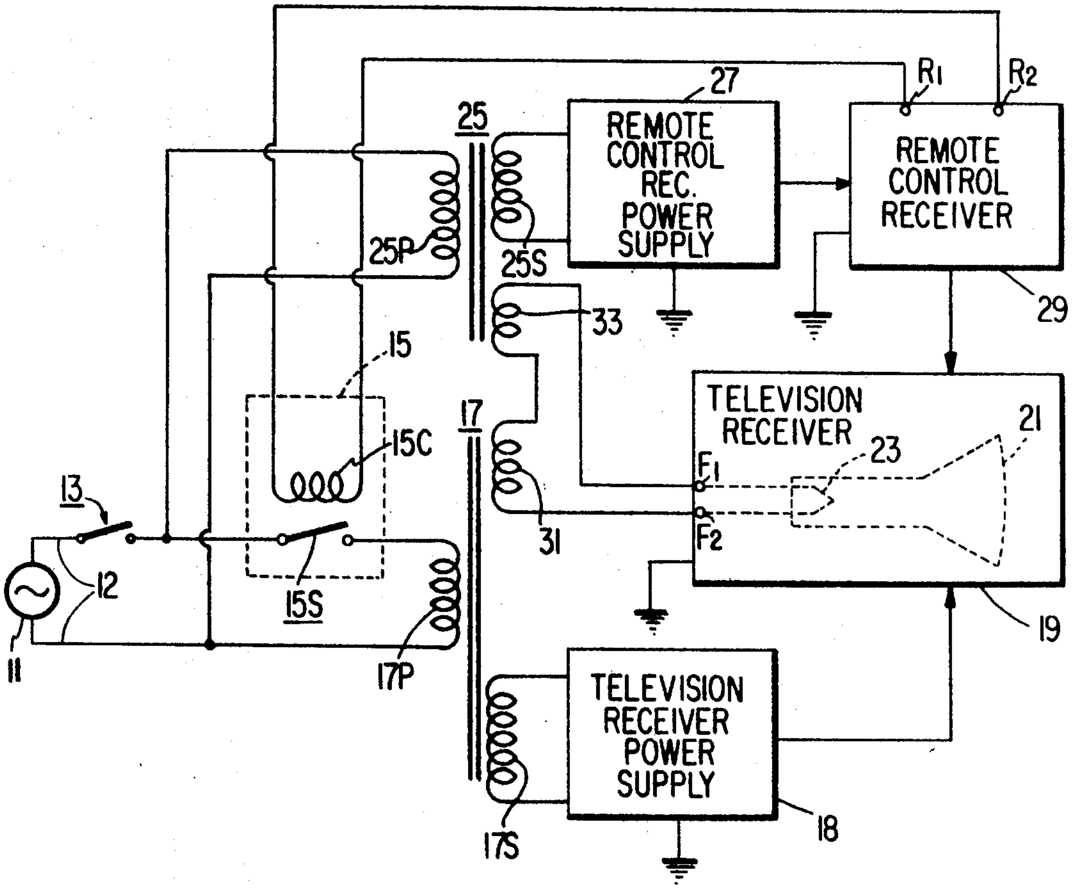
INVENTOR.
John Barrett George
BY William H. Meagher
ATTORNEY

INSTANT-ON CIRCUITRY FOR SOLID STATE TELEVISION RECEIVERS

The present invention relates generally to circuitry facilitating rapid switching of such apparatus as solid state television receivers from a standby condition to a fully operative condition.

It has heretofore been recognized as advantageous from the television receiver user's point of view to provide for rapid initiation of picture display following the user's switching of the receiver to an "on" condition. Such interest in so-called "instant-on" capability has led in the past, in the case of tube-type television receivers, to various receiver designs incorporating switching arrangements providing an "off" condition for the receiver which does not fully disable the receiver, but rather provides a standby condition. In such standby condition, the receiver tubes receive no unidirectional operating potentials but have their filaments energized at a level reduced from the normal operating level. Desirably, in such an arrangement, a master on-off switch is additionally provided to enable full disabling of the receiver when appropriate.

With the advent of solid state television receivers, the need for standby energization of the various signal processing devices of the receiver was eliminated. However, there still remained the need for standby energization of the picture tube—the standard monochrome or color kinescope being a thermionic device. Accordingly, where solid state television receivers are to take advantage of the "instant-on" capability inhering in the use of solid state devices, provision is made for switching between "on"—a fully operative condition—and a standby "off" condition, in which the solid state devices do not receive operating potentials but the kinescope filament is energized at a reduced level.

Prior art approaches to instant-on switching arrangements for solid state television receivers have heretofore necessitated the use of switches of a double-pole variety, either for the standby-on switching function or for the accompanying master on-off switching function. The present invention is directed to an instant-on switching arrangement that permits use of single-pole switches for both functions.

Where the switching is mechanical, ability to use single-pole switches is desirable from the point of view of simplification. Additionally, the single-pole switching arrangement readily lends itself to convenient and reliable electronic switching, as with a triac switching device. This is of particular interest in connection with television receivers subject to remote control.

In accordance with the principles of the present invention, use of a single-pole switching arrangement for an "instant-on" solid state television receiver is facilitated by the derivation of the full kinescope filament voltage desired for normal operation from series-connected secondary windings of two transformers. One transformer serves via an additional secondary winding as the AC input transformer for the solid state receiver's power supply circuits. The primaries of both transformers are paralleled across an AC input line. A single-pole switch, interposed in one conductor of the AC input line ahead of the connection to the power supply transformer but at a point subsequent to the takeoff connection to the second, "auxiliary" transformer, serves the standby-on switching function. A second single-pole switch, interposed in one conductor of the line ahead of both takeoff connections, serves the master on-off switching function.

In operation of the above-described arrangement, when the master on-off switch and the standby-on switch are both closed, both transformer primaries are energized. The receiver's solid state devices receive operating potentials from the power supply, and the kinescope filament operates at rated voltage, constituting the sum of the contributions of both of the series connected secondary windings.

When the standby-on switch is opened (with the master on-off switch remaining closed), energization of the power supply transformer primary is interrupted, while the auxiliary transformer primary remains energized. The voltage applied to the kinescope filament drops to a reduced level representing the contribution of the auxiliary transformer secondary alone. Current induced in the auxiliary transformer secondary flows via the low impedance power supply transformer secondary to the filament with little dropping of voltage across the low impedance winding. This flow of current in the low impedance secondary does provide a small degree (e.g. 2 percent) of energization of the other power supply transformer secondary winding. Such minor degree of energization is insufficient to turn on the signal processing circuits of the receivers, but does serve the desirable purpose of maintaining a slight polarization of the power supply filter capacitors.

When the master on-off switch is opened, both transformer primaries are deenergized. Under such condition, the receiver is fully disabled.

Where the television receiver is of the remote controlled type, and the ability to provide remote control of standby-on switching is desired, a power supply for the remote control receiver separate from the main receiver power supply is required. In such a receiver arrangement, AC input to the remote control receiver power supply via the "auxiliary" transformer is appropriate, and an additional secondary winding may be provided for that purpose. In this case, the standby condition of the receiver additionally includes energization of the remote control receiver power supply.

A primary object of the present invention is to provide novel and improved AC input switching arrangement for a television receiver or the like.

A further, particular object of the present invention is to provide a novel standby-on switching arrangement for an "instant-on" solid state television receiver, which arrangement facilitates the use of single-pole switches for the receiver's AC input switching functions.

Other objects and advantages of the present invention will be readily apparent to those skilled in the art upon a reading of the following detailed description and an inspection of the accompanying drawing, wherein the sole FIGURE illustrates, partially schematically and partially in block diagram form, a television receiver incorporating an embodiment of the present invention.

Referring to the drawing, it may be noted that, for illustrative purposes, the television receiver apparatus therein illustrated is of the type subject to remote control of its operation. In the drawing, an alternating current source 11, which may typically comprise the usual house current source, is coupled by an AC input line 12 comprising a pair of conductors, to the primary winding 17P of a first transformer 17. Interposed in one conductor of the line, in a manner to effectively permit selective interruption or completion of the energizing circuit for primary winding 17P, is a first single-pole, single-throw switch 13. Also interposed in said one conductor at a point intermediate switch 13 and primary winding 17P is a second single-pole, single-throw switch 15S with capability for enabling or precluding energization of winding 17P.

Transformer 17 is provided with a secondary winding 17S for supplying an alternating current input to a television receiver power supply 18, the latter supplying operating unidirectional potentials to the various signal processing stages of a television receiver 19. Television receiver 19 utilizes as its image reproducing device a kinescope 21 (shown in dotted outline only). Kinescope 21, being a tube of the type depending on thermal emission to produce electrons for its scanning beam, incorporates a heater element, filament 23 (also shown in dotted lines), connected between a pair of filament voltage supply terminals F1 and F2.

To appreciate the manner in which filament voltage is supplied to the kinescope heater element, consideration must be given to additional portions of the illustrated circuitry. A second, "auxiliary" transformer 25 is shown in the drawing, with its primary winding 25P connected across the AC input line for energization purposes, the connection of winding 25P to the switched conductor being at a point intermediate the respective switches 13 and 15S. By virtue of such point of connection, it will be seen that whereas the first switch 13 provides selective control of the completion or interruption of the energizing circuit for primary winding 25P, the energization of winding 25P is independent of the operation of the second switch 15S.

A secondary winding 25S of transformer 25 supplies an alternating current input to a remote control receiver power supply 27, the latter providing unidirectional operating potentials for the signal translating devices of a remote control receiver 29. The remote control receiver 29, selectively responding to remotely generated control signals, provides the television receiver user with the ability to remotely adjust operating parameters (e.g. channel selection, volume, brightness, etc.) of the television.

Illustratively, one of the functions that may be subject to remote control by the user is the switching of the television receiver 19 between an operating and a nonoperating condition. For such purpose, the remote control receiver 29 is provided with a pair of output terminals R1 and R2, across which is connected the energizing coil 15C of an electromagnetic relay 15. In this illustrative arrangement, the switch 15S comprises the controlled contacts of the relay 15. In one state of energization of relay 15, switch 15S is closed and operation of the television receiver is enabled; in the other state, switch 15S is open and receiver 19 is disabled.

In addition to the secondary windings heretofore described, each of the transformers 17 and 25 is provided with an additional secondary winding (31 and 33, respectively) for kinescope filament energization. The secondary windings 31 and 33 are serially connected between the aforementioned filament voltage supply terminals F1 and F2.

Consideration of the operation of the illustrated apparatus under various switching conditions is now in order. When switch 13, which constitutes the master on-off switch for the receiver arrangement, is open, the receiver arrangement is fully disabled. Television receiver 19 receives neither unidirectional operating potentials nor kinescope filament voltage, and the associated remote control receiver 29 is also inoperative. When the master on-off switch 13 is closed, however, the remote control receiver 29 is operative, and the condition of the television receiver 19 is either "on" (fully operative) or "standby," in accordance with the state of the switch 15S. To appreciate the character of the standby-on switching function of switch 15S, operating conditions for each switching state thereof will now be described, with a closed state assumed for the master on-off switch 13.

With switch 15S closed, both of the primary windings 17P and 25P are energized, and the normal AC input, required by the respective power supplies 18 and 27 to develop operating potentials for the respective receivers 19 and 29, is supplied by the respective secondary windings 17S and 25S. Developed across the kinescope filament terminals F1 and F2 is a supply voltage comprising the sum of the voltages induced across the respective secondary windings 31 and 33 in response to energization of the respective transformer primary windings 17P and 25P. The respective transformers 17 and 25 are designed so that the respective secondary contributions when the primaries are energized provide a sum equivalent to the rated filament voltage for the kinescope 21. Preferably, for the "instant-on" purposes of the present invention, the contribution provided by secondary winding 33 is substantially greater than that provided by secondary winding 31; in an illustrative example, where the full rated filament voltage is 6.0 volts, the contribution of secondary winding 33 is approximately 4.5 volts to which a 1.5 volt contribution of secondary winding 31 is added.

When switch 15S is opened, the alternating current input from source 11 is removed from primary winding 17P of transformer 17, while the primary winding 25P of transformer 25 continues to be energized by source 11. The filament voltage contribution of secondary winding 33 is still present, but secondary winding 31 no longer serves as a voltage source. However, winding 31 now serves as a low impedance path completing the filament circuit and permitting energization of filament 23 at a reduced level (e.g., 4.5 volts) substantially equal to the contribution of winding 33 alone. With current flowing through winding 31, as above described, there is a minor degree of energization of secondary winding 17S, with winding 31 serving as an inefficient primary. Typically, such level of energization will be so low (e.g., 2 percent of the voltage induced in the "on" condition) that the signal processing stages of television receiver will be inoperative. This low level input to the receiver power supply 18 will, however, maintain the filter capacitors in supply 18 slightly polarized in the "standby" condition of the receiver, which may be of advantage in lengthening the life of electrolytics performing the filtering function.

Thus, in the "standby" condition obtained by opening switch 15S, television receiver 19 is not operating, its signal processing stages (including, of course, those rendering kinescope capable of displaying a raster) lacking inadequate operating potential input from supply 18; however, kinescope filament 23 is energized at a selected fraction of its rated voltage. With the fraction of the order of the illustrative magnitude (4.5/6.0), the "standby" temperature of the filament 23 is sufficiently elevated that, when the receiver 19 is turned "on" by closing switch 15S, the kinescope will rise to full emission capability with a rapidity sufficiently close to that of the turn-on of solid state signal processing stages to warrant the "instant-on" characterization. During "standby" operation, with energization of primary winding 25P maintained, remote control receiver is operative, thus enabling the user to remotely switch when desired from "standby" to "on" via relay 15.

It should also be appreciated that, while a mechanical switch symbol has been employed for illustration purposes in the drawing, the single-pole, single-throw function of switch 15S may be performed electronically, as by use of an electronic switch of the triac type, for example, without departing from the scope of the present invention. Also, while a simple kinescope 21 employing a single filament 23 has been illustrated in the drawing for the sake of simplicity, the invention has been particularly used to advantage in association with a television receiver of the color type, employing a trigun color kinescope incorporating a multifilament structure. The applicability of the terms of the appended claims to such color receiver use should be understood.

What is claimed is:

1. In a television receiver including signal processing stages requiring a unidirectional operating potential, an image reproducing tube of a thermionic type incorporating a heater structure, having a pair of supply terminals, and an alternating current input line adapted for connection to an alternating current source, the combination comprising:

a first transformer having a primary winding and a plurality of secondary windings;

a second transformer having a primary winding, a first secondary winding and an additional secondary winding;

switching means associated with said alternating current input line for permitting energization of said primary winding of said first transformer by alternating current from said source in a first switching state and for precluding energization of said primary winding of said transformer by alternating current from said source in a second switching state;

means coupling the primary winding of said second transformer to said alternating current input line in a manner permitting energization of the primary winding of said second transformer with alternating current from said source in either of the switching states of said switching means;

a television receiver power supply for developing said unidirectional operating potential in response to an alternating current input; means for utilizing one of the secondary windings of said first transformer to supply said alternating current input to said power supply;

means for serially connecting and additional one of the secondary windings of said first transformer and said first secondary winding of said second transformer across said supply terminals of said heater structure;

a remote control receiver having a plurality of outputs, one of said outputs serving to control said switching means, and requiring a unidirectional supply potential for operability;

remote control receiver power supply means for developing said unidirectional supply potential in response to an alternating current input;

and means for utilizing said additional secondary winding of said second transformer to supply said alternating current input to said remote control receiver power supply.

2. Apparatus in accordance with claim 1 wherein the voltage developed across said additional secondary winding of said first transformer when said switching means is in said first switching state is significantly less than the voltage developed across said first secondary winding of said second transformer, the sum of said voltages being substantially equal to the full rated voltage for normal operation of said heater structure.

3. In a remote controlled, solid state television receiver including (a) solid state television signal processing stages requiring unidirectional operating potentials of given levels for operability; (b) a kinescope having a filament structure extending between a pair of supply terminals and requiring a supply potential of a predetermined magnitude for normal operation; (c) a remote control receiver having a plurality of outputs for selectively adjusting operating parameters of said television receiver; said remote control receiver requiring a unidirectional supply potential for operability; and (d) an alternating current input line adapted for connection to an alternating current source; the combination comprising:

television receiver power supply means for developing unidirectional operating potentials for said processing stages;

a main power supply transformer having a primary winding and a pair of secondary windings;

remote control receiver power supply means for developing said unidirectional supply potential for said remote control receiver;

an auxiliary power supply transformer having a primary winding and a pair of secondary windings;

means for coupling one of the secondary windings of said main transformer to said television receiver power supply means;

means for coupling one of the secondary windings of said auxiliary transformer to said remote control receiver power supply means;

means for connecting the remaining secondary windings of said main and said auxiliary transformers in series across said pair of supply terminals for said filament structure;

means, including a single-pole, single-throw switch subject to control by one of said remote control receiver outputs, for coupling said primary winding of said main transformer to said alternating current input line only when said switch is closed;

and means, independent of said single-pole, single-throw switch, for coupling said primary winding of said auxiliary transformer to said alternating current input line.

4. Apparatus in accordance with claim 3 wherein the winding ratios associated with said main and auxiliary transformers are such that a supply potential of said predetermined magnitude is developed across said pair of supply terminals for said filament structure when said switch is closed, and a supply potential less than said predetermined magnitude but greater than half thereof is developed across said pair of supply terminals when said switch is open.

5. Apparatus in accordance with claim 3 also including a second single-pole, single-throw switch for selectively deenergizing both of said primary windings.